UNITED STATES PATENT OFFICE.

CARLETON ELLIS, OF MONTCLAIR, NEW JERSEY, ASSIGNOR TO CHADELOID CHEMICAL COMPANY, OF NEW YORK, N. Y., A CORPORATION OF WEST VIRGINIA.

FINISH-REMOVER.

1,000,162.　　　Specification of Letters Patent.　　Patented Aug. 8, 1911.

No Drawing.　　Application filed December 20, 1910.　Serial No. 598,398.

*To all whom it may concern:*

Be it known that I, CARLETON ELLIS, a citizen of the United States, and resident of Montclair, Essex county, New Jersey, have made a certain new and useful Invention Relating to Finish-Removers, of which the following is a specification.

This invention relates especially to finish removers comprising alkali phenates which may be incorporated in strong aqueous solutions with volatile organic finish solvents with many of which they are miscible throughout considerable ranges, cheap and effective removers being secured in this way which may, if desired, be given non-inflammable properties.

The undesirable acid properties of carbolic and cresylic acids and similar phenolic material may be completely neutralized by combining them with suitable alkali material such as caustic soda or potash to form the corresponding alkali phenates which are salts usually having more or less alkaline reaction. Strong aqueous solutions of such phenates have energetic removing action on many paints and other finishes and also have the property of being miscible throughout a considerable range of proportions with benzol, toluol and other water immiscible penetrating solvents, other finish solvents being added as desired, those of a substantially water immiscible character being preferable for some purposes; and it is of course understood that the incorporation of waxy and other evaporation retarding material minimizes evaporation of the volatile solvents employed and may also exert a desirable stiffening action on the compositions. In making up such compositions the alkali phenates may be first prepared and then dissolved in water to give forty or fifty per cent. or so solutions or if desired, the carbolic or cresylic acid or other phenolic material may be first combined with the solvents to form a miscible solution therewith and then the desired amount of strong aqueous solution of caustic potash or soda added and thoroughly incorporated to effect the conversion of the phenolic material to the desired extent. Non-inflammable removers may be prepared in this way without the necessity of using chlorinated solvents and for this purpose the organic finish solvents should preferably be those having the higher boiling and flash points such as coal tar solvent naphtha, the third distillate from coal tar as usually prepared, have a specific gravity of .875 and a flash point of about eighty degrees Fahrenheit or more, and consisting of xylol, cumol and mesitylene, about ninety per cent. distilling off at one hundred and sixty degrees centigrade. Another desirable penetrating finish solvent, that is, solvent material having generally benzolic character or action in removers and so forth, is pine oil or the commercial grades of xylol and toluol which may be used although of somewhat greater inflammability. Terpineol, oil of camphor, wood turpentine, turpentine, and tar oil may also be used as well as chlorinated solvents in some cases such as carbontetrachlorid dichlorhydrin, epichlorhydrin, chlorbenzol, pentachlorethylene, trichlorethylene, etc.

The loosening solvent material, that is, solvents of a generally alcoholic character or action in removers should preferably be of a rather water immiscible character where considerable aqueous material is present in the remover, benzyl, allyl and amyl alcohols being desirable for this reason, although the lighter alcohols such as methyl, ethyl, propyl, butyl preferably in their commercial forms such as denatured alcohol, may be used in some cases and the allied ketonic loosening solvents such as methylethyl ketone, ethylbutyl ketone, acetone, oil of acetone, methyl acetone and their condensation derivatives, and the generally allied esteric solvents such as the acetates, phenates and other similar compounds of these loosening solvents.

For ordinary service conditions it is desirable to incorporate suitable stiffening material with the composite solvent forming the great bulk of the remover and the effective film forming action and evaporation retarding action of waxy stiffening material such as paraffin, ceresin, ozokerite, beeswax and the like, are desirable although other stiffening materials such as wood-flour, starch, infusorial earth, pyroxylin and fatty or soapy material such as soda or potash resin soaps for example are desirable in some cases. It is also desirable under some conditions to use such blending agents as red oil or oleic acid or the sulfonated oils such as Turkey red oil or sulfonated castor oil which minimize any separating tendency of the remover components and promote the homogeneous mixture of the liquid portions of the remover.

A suitable illustrative remover of this character may be prepared by mixing 40 parts by volume of a fifty per cent. aqueous solution of potassium cresylate with 20 parts of solvent naphtha in which 2 parts of ceresin had been dissolved and then incorporating 10 parts of pine oil and 20 parts of benzyl alcohol and 5 parts of Turkey red oil so as to produce a homogeneous remover having remarkable non-inflammable properties. Another non-inflammable remover of this character giving good results on varnish finishes, may be produced by incorporating 60 parts of a forty per cent. aqueous solution of potassium cresylate in 15 parts of solvent naphtha containing 3 parts of dissolved paraffin, 10 parts of pine oil, 25 parts of benzyl alcohol and 3 parts of Turkey red oil or concentrated sulfonated castor oil. Another remover may be prepared by incorporating 10 parts of a fifty per cent. aqueous solution of sodium carbolate, 10 parts of benzol containing one part of dissolved paraffin with 30 parts of methyl acetone. Another remover may be made by suitably incorporating 13 parts of benzol and 2 parts of pine oil containing 3 parts of Japan wax and 4 parts of rosin with 70 parts of methyl acetone and 4 parts of red oil, 2 parts of a fifty per cent. caustic potash and 20 parts of water. Another remover may comprise 50 parts of benzol and 50 parts of pine oil containing 2 parts of dissolved paraffin and 10 parts of rosin, 50 parts of cresylic acid, 10 parts of oleic acid or of Turkey red oil and 10 parts of a fifty per cent. caustic potash solution. Another remover may comprise 10 parts of benzol containing one part of dissolved ceresin, 10 parts of cresylic acid, 3 parts of chlorcresol, 3 or 4 parts of a fifty per cent. solution of caustic potash and sufficient water to make 30 parts. Another remover may comprise 20 parts of benzol containing one part of dissolved paraffin, 20 parts of cresylic acid, 6 parts of a fifty per cent. solution of caustic potash and sufficient water to make 60 parts.

This invention has been described in connection with a number of illustrative ingredients, formulas, proportions and processes, to the details of which disclosure the invention is not of course to be limited.

What is claimed is:

1. The non-inflammable finish remover comprising substantially 40 parts of a fifty per cent. aqueous solution of potassium cresylate, 20 parts of solvent naphtha in which 2 parts of ceresin have been dissolved, 10 parts of pine oil, 20 parts of benzyl alcohol and 5 parts of Turkey red oil.

2. The substantially non-inflammable finish remover comprising substantially 40 parts of a fifty per cent. solution of potassium phenate, 20 parts of solvent naphtha in which waxy stiffening material has been dissolved, 10 parts of pine oil, 20 parts of benzyl alcohol and incorporated blending material.

3. The substantially non-inflammable finish remover comprising substantially 40 parts of a strong aqueous solution of alkali phenate, 30 parts of penetrating finish solvent, 20 parts of substantially water immiscible alcoholic solvent and waxy and blending material.

4. The substantially non-inflammable finish remover comprising a large proportion of a strong aqueous solution of alkali phenate, a substantially similar amount of penetrating finish solvent material, alcoholic finish solvent material and incorporated waxy stiffening material.

5. The substantially non-inflammable finish remover comprising a large proportion of a strong aqueous solution of alkali phenate, penetrating finish solvent material comprising solvent naphtha, substantially water immiscible loosening finish solvent material and incorporated stiffening material.

6. The finish remover comprising a strong aqueous solution of alkali phenate, penetrating and loosening finish solvent material miscible with said aqueous solution and incorporated stiffening material.

7. The finish remover comprising a considerable proportion of a strong aqueous solution of alkali phenate, miscible organic finish solvent material and incorporated stiffening material.

8. The finish remover comprising a considerable proportion of an aqueous solution of alkali phenate, miscible composite substantially water immiscible organic finish solvent material and stiffening material.

9. The finish remover comprising a considerable proportion of an aqueous solution of alkali phenate, blending material and miscible composite organic finish solvent material.

10. The finish remover comprising an aqueous solution of alkali cresylate, blending material and miscible organic finish solvent material comprising penetrating finish solvent material.

11. The finish remover comprising a considerable proportion of a strong aqueous solution of alkali cresylate and miscible composite volatile organic finish solvent material comprising water immiscible solvent.

12. The finish remover comprising a considerable proportion of a strong aqueous solution of alkali phenate, miscible volatile organic finish solvent material and incorporated waxy stiffening material.

13. The substantially homogeneous fluent finish remover comprising a considerable proportion of a strong aqueous solution of potassium cresylate and miscible composite organic finish solvent material comprising dissolved wax and substantially water immiscible penetrating finish solvent.

14. The substantially homogeneous fluent finish remover comprising a considerable proportion of an aqueous solution of alkali cresylate and miscible composite volatile organic finish solvent material comprising penetrating finish solvent and incorporated mineral wax.

15. The substantially homogeneous fluent finish remover comprising a considerable proportion of a strong solution of potassium cresylate and miscible composite organic finish solvent material comprising dissolved wax and substantially water immiscible penetrating finish solvent.

16. The substantially homogeneous fluent finish remover comprising a considerable proportion of a solution of alkali phenate and miscible composite volatile organic finish material comprising penetrating finish solvent and incorporated mineral wax.

CARLETON ELLIS.

Witnesses:
HARRY L. DUNCAN,
JESSIE B. KAY.